(12) United States Patent
Braiman

(10) Patent No.: US 7,395,966 B2
(45) Date of Patent: Jul. 8, 2008

(54) TRACKING SYSTEM USING OPTICAL TAGS

(75) Inventor: Michael Braiman, Netania (IL)

(73) Assignee: Parelec Israel Ltd., Petach Tikva (IL)

( * ) Notice: Subject to any disclaimer, the term of this patent is extended or adjusted under 35 U.S.C. 154(b) by 204 days.

(21) Appl. No.: 10/564,270

(22) PCT Filed: May 14, 2004

(86) PCT No.: PCT/IL2004/000413

§ 371 (c)(1), (2), (4) Date: Jan. 4, 2006

(87) PCT Pub. No.: WO2004/102462

PCT Pub. Date: Nov. 25, 2004

(65) Prior Publication Data

US 2007/0029381 A1 Feb. 8, 2007

(30) Foreign Application Priority Data

May 14, 2003 (IL) ........................................ 155921

(51) Int. Cl.
G06K 19/06 (2006.01)

(52) U.S. Cl. ........................ 235/454; 235/385; 235/439

(58) Field of Classification Search .................. 235/491, 235/469, 435, 385, 454, 494
See application file for complete search history.

(56) References Cited

U.S. PATENT DOCUMENTS 4,853,524 A * 8/1989 Yamaguchi et al. .......... 235/468
5,196,682 A * 3/1993 Englehardt ................... 235/454

* cited by examiner

Primary Examiner—Seung H Lee
(74) Attorney, Agent, or Firm—Klehr, Harrison, Harvey, Branzburg & Ellers, LLP

(57) ABSTRACT

A method for identifying objects including fixing tags to respective objects, each such tag comprising at least one optical emitter. The at least one optical emitter on each of the tags is driven to emit optical radiation of a respective color, selected from among the first plurality of colors emittable by the tags, during a respective time slot, selected from among a second plurality of time slots during which the tags may emit the optical radiation. A camera captures sequence of electronic images of an area containing the objects to which the tags are fixed. The electronic images in the sequence are processed in order to identify, responsively to the colors of the optical radiation emitted by the tags and the time slots in which the optical radiation is emitted, the objects to which the tags are fixed.

21 Claims, 2 Drawing Sheets

TRACKING SYSTEM USING OPTICAL TAGS

FIELD OF THE INVENTION

The present invention relates generally to object identification and location systems, and specifically to optical systems for simultaneously identifying and tracking locations of multiple objects.

BACKGROUND OF THE INVENTION

Various methods are known in the art for remote identification and tracking the location of a movable object within a controlled area. For example, radio frequency (RF) identification tags may be fixed to objects in the area. Each tag typically comprises a RF transceiver, which transmits a unique identification code when queried by a signal from a central antenna. Such systems may be capable of identifying multiple objects, but they generally give only a rough indication of the location of each object. Optical markers can be tracked using video cameras to obtain more accurate position information. Optical systems of this sort, however, generally require the use of sophisticated and costly image processing equipment, and are limited in the number of objects that they can track simultaneously.

SUMMARY OF THE INVENTION

In embodiments of the present invention, an optical identification and tracking system uses both time and wavelength multiplexing in order to identify and accurately track the locations of a number of objects in a defined area. An optical tag is fixed to each object. Each tag is programmed to emit optical radiation of a certain color during a predetermined time slot, among a number of different colors and a plurality of synchronized time slots that are available. One or more cameras, typically video cameras, capture a sequence of electronic images of the radiation emitted by the tags in each time slot. A processing unit analyzes the images in order to determine location coordinates of each tag. In this manner, the system is able to identify and accurately track the location of multiple moving objects simultaneously—up to at least a number of objects equal to the product of the number of time slots times the number of different colors.

There is therefore provided, in accordance with an embodiment of the present invention, apparatus for identifying objects, including:

a multiplicity of tags, each such tag being adapted to be fixed to a respective one of the objects and including:

at least one optical emitter, which is adapted to emit optical radiation of a respective color, selected from among a first plurality of colors emittable by the tags; and a controller, which is coupled to drive the at least one optical emitter to emit the optical radiation during a respective time slot, selected from among a second plurality of time slots during which the tags may emit the optical radiation;

at least one camera, which is adapted to capture a sequence of electronic images of an area containing the objects to which the tags are fixed; and an image processor, which is adapted to process the electronic images in the sequence in order to identify, responsively to the colors of the optical radiation emitted by the tags and the time slots in which the optical radiation is emitted, the objects to which the tags are fixed.

In some embodiments, for each of at least some of the tags, the at least one optical emitter includes at least first and second optical emitters of different, first and second colors, and the controller is configurable to select one of the first and second colors to be emitted by the tag.

Typically, the tags are configured so that no more than one of the tags emits any one of the colors during any of the time slots.

In an aspect of the invention, the controller is adapted to receive a synchronization input and to synchronize the respective time slot responsively to the synchronization input, so that all the tags are in mutual synchronization. In a disclosed embodiment, the apparatus includes a synchronization transmitter, which is adapted to transmit a synchronization signal over the air in the area containing the objects, wherein each of the tags includes a synchronization module, which is coupled to receive the synchronization signal and responsively thereto, to generate the synchronization input to the controller. Typically, the synchronization signal includes a radio frequency (RF) signal or, alternatively, an infrared (IR) signal.

In an embodiment of the invention, the at least one optical emitter includes at least one light-emitting diode (LED).

In some embodiments, the image processor is further adapted to process the electronic images in the sequence in order to determine, responsively to the colors of the optical radiation emitted by the tags and the time slots in which the optical radiation is emitted, location coordinates of the objects. The apparatus may include a memory, coupled to the image processor, which is adapted to create a location database in the memory, containing records of motion of the objects in the area, based on the location coordinates determined by the image processor. In one embodiment, the objects include animals.

There is also provided, in accordance with an embodiment of the present invention, a method for identifying objects, including:

fixing tags to respective objects, each such tag including at least one optical emitter;

driving the at least one optical emitter on each of the tags to emit optical radiation of a respective color, selected from among a first plurality of colors emittable by the tags, during a respective time slot, selected from among a second plurality of time slots during which the tags may emit the optical radiation;

capturing a sequence of electronic images of an area containing the objects to which the tags are fixed; and processing the electronic images in the sequence in order to identify, responsively to the colors of the optical radiation emitted by the tags and the time slots in which the optical radiation is emitted, the objects to which the tags are fixed.

The present invention will be more fully understood from the following detailed description of the embodiments thereof, taken together with the drawings in which:

DETAILED DESCRIPTION OF EMBODIMENTS

Figure 1:
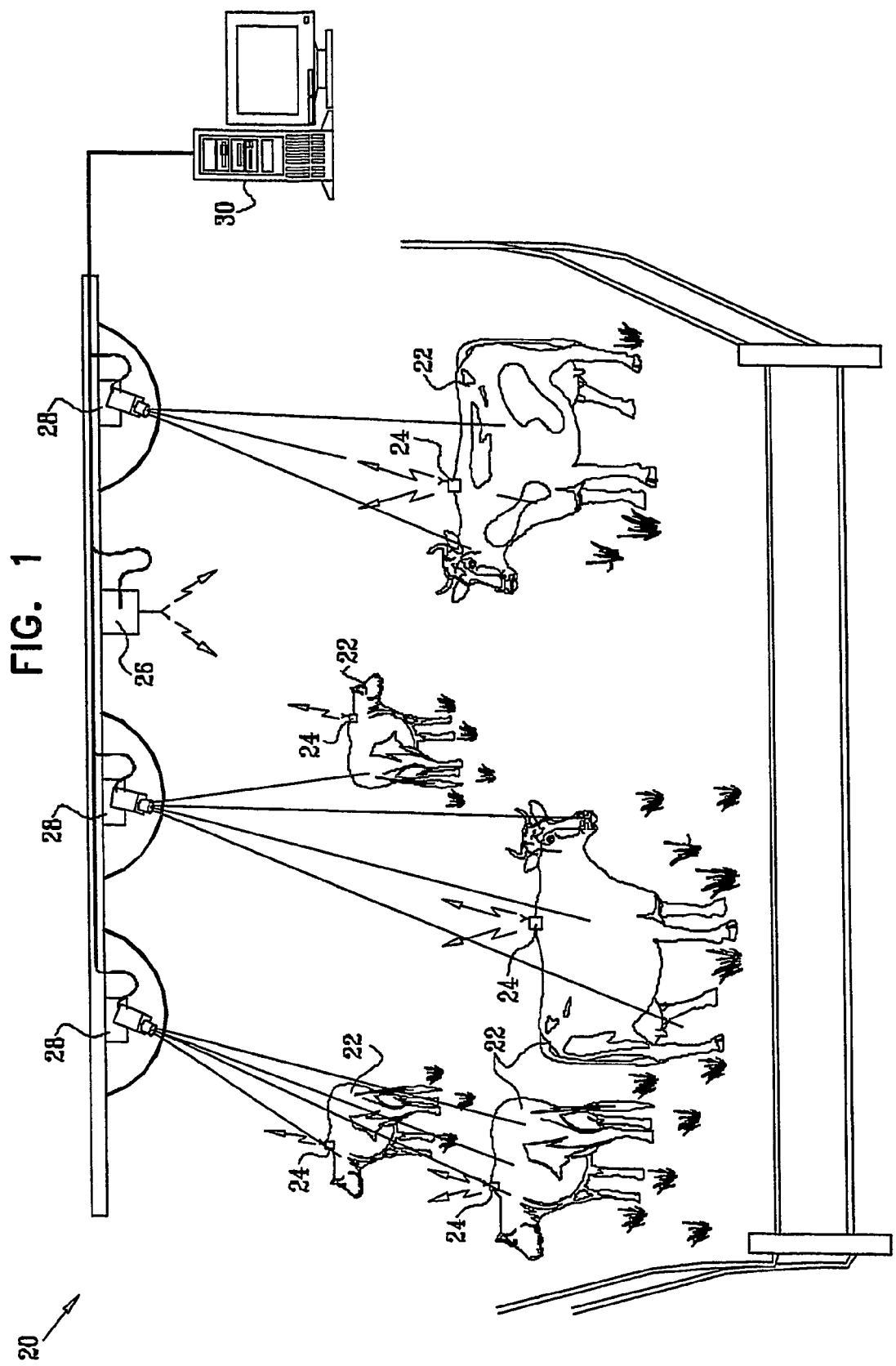
FIG. 1 is a schematic, pictorial illustration of a system for tracking animals, in accordance with an embodiment of the present invention.

FIG. 1 is a schematic, pictorial illustration of a system 20 for tracking animals 22, in accordance with an embodiment of the present invention. In the present example, animals 22 comprise cows, and system 20 is used to identify and track the locations of the cows within a large, enclosed area, such as a dairy barn. It will be understood, however, that this application of the present invention is shown here solely by way of example, and the principles of system 20 may be applied in a wide range of other applications, for tracking people, animals or other movable objects.

An optical tag 24 is fixed externally to each animal 22. All of tags 24 operate in mutual synchronization, in accordance with RF synchronization signals broadcast by an antenna 26. Typically, antenna 26 transmits these signals at approximately 433 MHz in the ISM band, with 1.5 MHz bandwidth. Alternatively, antenna 26 may transmit in the 846 MHz band, or in any other suitable band permitted by regulatory authorities. Further alternatively, system 20 may use optical synchronization signals, such as infrared (IR) pulses transmitted by a suitable IR transmitter, in place of antenna 26.

As yet another alternative, tags 24 may synchronize on an external signal, such as a beacon provided by a cellular communication network or a Global Positioning System (GPS).

In response to the synchronization signal from antenna 26, each tag 24 transmits light of an assigned color in an assigned time slot. Each tag is programmed in advance with its time slot and color assignments. For example, each tag may be programmed to transmit in one of 480 successive time slots, each typically 1-4 sec long, during which the tag emits either red, green or blue light. Alternatively, there may be a larger or smaller number of available time slots, which may be longer or shorter in duration, and a larger or smaller number of colors may be used. Further alternatively, tags 24 may be configured to emit IR or ultraviolet (UV) radiation. The term "optical radiation," as used in the present patent application and in the claims, should thus be understood to refer to any radiation in the visible, IR or UV range, while the term "color" refers to any distinguishable wavelength band in any of these ranges.

In the above example, it will be observed that there are 1440 possible combinations of different time slots with different radiation colors, so that system 20 is capable of distinguishing among at least 1440 different animals 22 with their individual tags 24. More advanced techniques, such as transmission by certain tags 24 of multiple colors, transmission by certain tags in a predetermined sequence of time slots, or selective transmission, whereby only certain tags transmit after any given synchronization signal, may be used to increase the capacity of system 20 still further. For example, tags 24 may operate dynamically, requesting a time slot and then transmitting optical radiation only after a certain event occurs, such as movement of animal 22 to which the particular tag is fixed. Image processing techniques may further be used to distinguish among multiple tags transmitting in the same time slot.

Video cameras 28, which are typically mounted above animals 22, capture images that include the radiation emitted by tags 24. Typically, cameras 28 comprise standard CCD- or CMOS-based solid state image sensors, spaced about 10-20 m apart, depending on the mounting height and the resolution required of system 20. For example, cameras 28 may comprise model CV7017H CCD cameras, produced by Appro Technologies (Taiwan), which are ceiling-mounted, face down, within a protective plastic cover. The video signals are input to a central processing and control unit 30, which analyzes the signals to determine the location of each tag 24, based on the timing and color of the radiation emitted by each tag. Unit 30 is thus able to maintain a location log for each animal 22, showing its movement over time within the area monitored by system 20.

Figure 2:
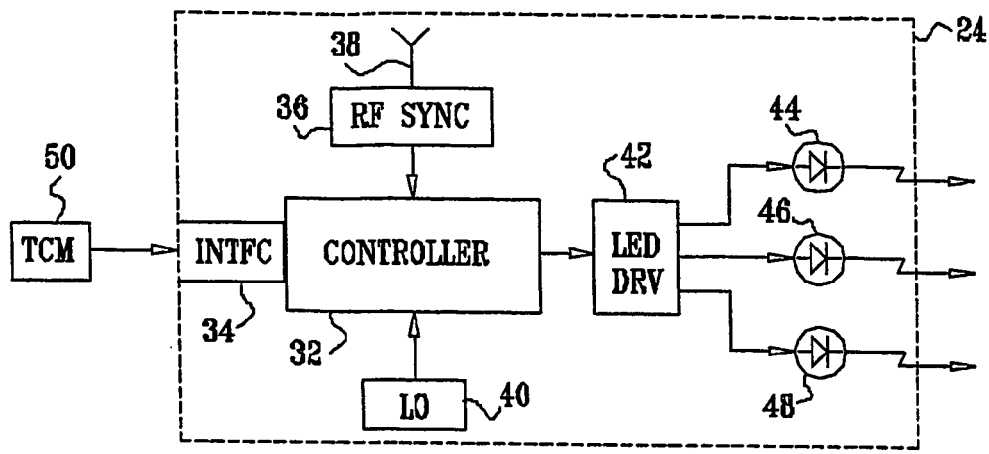
FIG. 2 is a block diagram that schematically illustrates elements of an optical tag, in accordance with an embodiment of the present invention.

FIG. 2 is a block diagram that schematically shows details of tag 24, in accordance with an embodiment of the present invention. A timing controller 32 determines the color and time slot in which tag 24 is to emit radiation, wherein the time slot is determined in relation to the synchronization signals transmitted by antenna 26. The time slot and color assignments of tag 24, and possibly other configurable operating parameters, as well, are input to controller 32 via a control interface 34. Operating power for the components of tag 24 is typically supplied by an on-board battery (not shown), although power may alternatively be supplied externally, via solar cells or RF induction, for example, as is known in the art. The components of the tag may be integrated into a single microelectronic chip, contained within a package that is capable of withstanding the stresses and wear present in the operating environment of system 20. Alternatively, tag 24 may comprise a circuit board or other substrate on which two or more chips are mounted.

A RF synchronization module 36 receives the synchronization signals from antenna 26 via an internal antenna 38 within tag 24. Based on these signals, module 36 generates a synchronization input to controller 32. Typically, the synchronization signal transmitted by antenna 26 comprises a pulse or a train of pulses in a predetermined pattern, indicating the beginning of a global synchronization period (GSP) for all of tags 24. (Different pulse trains may also be used to encode data representing the current time slot number.) Module 36 filters, amplifies and discriminates the RF signals received by antenna 38 in order to detect the pulse or pattern of pulses transmitted by antenna 26. When the synchronization signal comprises a pulse train (for synchronization purposes and possibly to represent the current time slot number), module 36 correlates the pattern of received pulses with a predetermined reference pattern in order to detect the exact synchronization, and accordingly signals the beginning of the GSP to controller 32. It is generally desirable that synchronization modules 36 in all of tags 24 synchronize on the signals from antenna 26 with a maximum tag-to-tag deviation no greater than $\frac{1}{10}$ of a time slot.

Controller 32 uses a clock provided by a local oscillator 40 in order to determine when its assigned time slot occurs within the GSP, relative to the synchronization input from module 36.

When the assigned time slot arrives, controller 32 triggers a LED driver circuit 42 to actuate one of LEDs 44, 46 and 48. Typically, each of the LEDs emits radiation of a different color. For example, LED 44 may emit red light, LED 46 green light, and LED 48 blue light. The choice of which LED to actuate is typically pre-programmed via interface 34, so that no more than one tag 24 emits radiation of a given color during any given time slot. Alternatively or additionally, system 20 may comprise different groups of tags 24, wherein each tag has a single LED, and a different color LED is used in the tags of each group. Further alternatively, other types of variable-wavelength or fixed-wavelength light sources may be used.

A time-slot configuration management (TCM) device 50 is used to program controller 32 via interface 34. For this purpose, interface 34 may comprise a plug (not shown), which mates with TCM device 50, or the TCM device may alternatively communicate with interface 34 over a wireless link, such as a RF or IR link. TCM device 50 is used to configure the timing parameters of each tag 24, including:

The GSP duration (typically between 1 and 8 min).
Time slot duration (typically between 1 and 4 sec).
Time slot selection (typically from time slot #1 to #480).

As noted above, TCM device 50 may also be used to set other operating parameters of tag 24, such as color selection. Although certain ranges of GSP and time slot duration are listed above by way of example, larger or smaller durations may also be used.

Figure 3:
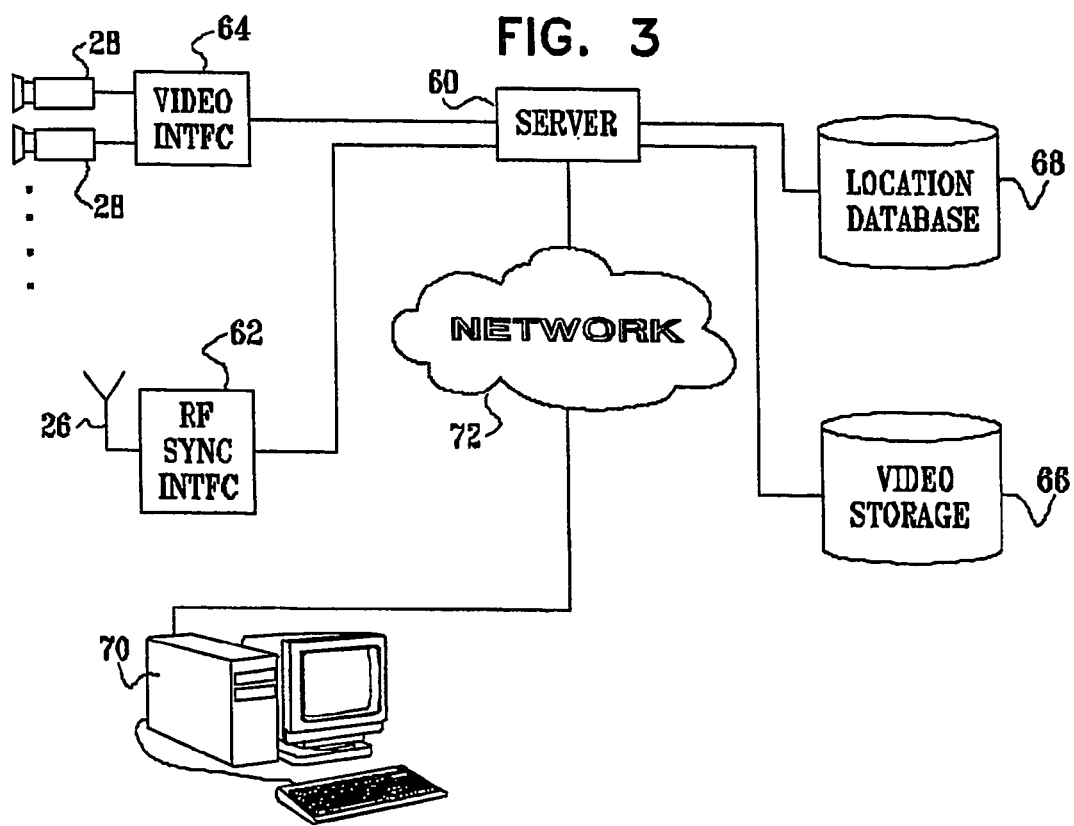
FIG. 3 is a block diagram that schematically illustrates a central processing and control unit used in an optical tracking system, in accordance with an embodiment of the present invention.

FIG. 3 is a block diagram that schematically shows details of processing and control unit 30, in accordance with an embodiment of the present invention. Unit 30 is built around a server 60, which typically comprises a personal computer running the Microsoft Windows® operating system. Server 60 controls a RF synchronization interface 62, comprising a RF transmitter, which transmits the RF synchronization signals via antenna 26, as described above. Video signals from cameras 28 are received and digitized by a video interface 64, such as the PV 143 WDM video capture card, produced by Professional Video (Taiwan), which inputs the digitized video signals from the cameras to server 60 for analysis. A video storage repository, typically comprising a large-capacity hard disk or disk array, may be provided in order to store selected frames (or all frames, if desired) from the video streams that are received by interface 64.

Server 60 processes the digitized video image output from each of cameras 28 in turn, in order to locate the bright, colored lights emitted by different tags 24 during successive time slots. Locations of cameras 28 are registered and calibrated, so that server 60 is able to associate the pixels in the images produce by each of the cameras with specific location coordinates in the area monitored by system 20. Thus, when server 60 finds that radiation of a particular color was detected at a given pixel (or group of pixels) in the image received by a particular camera 28 during a particular time slot, the server is able to determine unequivocally the identity of the tag that emitted the radiation and the location coordinates of the tag. Server 60 records this information in a location database 68, which is typically held in disk memory.

Users of system 20 may access the information in database 68, as well as in repository 66, via server 60. The server may have a communication interface to a network 72, allowing a client computer 70 to access the information remotely, via the network. The information in database 68 indicates to the user which animals 22 were located in the monitoring area of system 20 at any point in time, and also provides a record of the locations and movements of the animals within the area. The user may similarly access server 60 in order to find the current locations of particular animals in real time.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Apparatus for identifying objects, comprising:
   a multiplicity of tags, each such tag being adapted to be fixed to a respective one of the objects and comprising:
      at least one optical emitter, which is adapted to emit optical radiation of a respective color, selected from among a first plurality of colors emittable by the tags; and
      a controller, which is coupled to drive the at least one optical emitter to emit the optical radiation during a respective time slot, selected from among a second plurality of time slots during which the tags may emit the optical radiation;
   at least one camera, which is adapted to capture a sequence of electronic images of an area containing the objects to which the tags are fixed; and
   an image processor, which is adapted to process the electronic images in the sequence in order to identify, responsively to the colors of the optical radiation emitted by the tags and the time slots in which the optical radiation is emitted, the objects to which the tags are fixed.

2. The apparatus according to claim 1, wherein for each of at least some of the tags, the at least one optical emitter comprises at least first and second optical emitters of different, first and second colors, and wherein the controller is configurable to select one of the first and second colors to be emitted by the tag.

3. The apparatus according to claim 1 or 2, wherein the tags are configured so that no more than one of the tags emits any one of the colors during any of the time slots.

4. The apparatus according to claim 1, wherein the controller is adapted to receive a synchronization input and to synchronize the respective time slot responsively to the synchronization input, so that all the tags are in mutual synchronization.

5. The apparatus according to claim 4, and comprising a synchronization transmitter, which is adapted to transmit a synchronization signal over the air in the area containing the objects, wherein each of the tags comprises a synchronization module, which is coupled to receive the synchronization signal and responsively thereto, to generate the synchronization input to the controller.

6. The apparatus according to claim 5, wherein the synchronization signal comprises a radio frequency (RF) signal.

7. The apparatus according to claim 1, wherein the at least one optical emitter comprises at least one light-emitting diode (LED).

8. The apparatus according to claim 1, wherein the image processor is further adapted to process the electronic images in the sequence in order to determine, responsively to the colors of the optical radiation emitted by the tags and the time slots in which the optical radiation is emitted, location coordinates of the objects.

9. The apparatus according to claim 8, and comprising a memory, coupled to the image processor, which is adapted to create a location database in the memory, containing records of motion of the objects in the area, based on the location coordinates determined by the image processor.

10. The apparatus according to claim 9, wherein the objects comprise animals.

11. A method for identifying objects, comprising:
   fixing tags to respective objects, each such tag comprising at least one optical emitter;
   driving the at least one optical emitter on each of the tags to emit optical radiation of a respective color, selected from among a first plurality of colors emittable by the tags, during a respective time slot, selected from among a second plurality of time slots during which the tags may emit the optical radiation;
   capturing a sequence of electronic images of an area containing the objects to which the tags are fixed; and
   processing the electronic images in the sequence in order to identify, responsively to the colors of the optical radiation emitted by the tags and the time slots in which the optical radiation is emitted, the objects to which the tags are fixed.

12. The method according to claim 11, wherein driving the at least one optical emitter comprises selecting one of at least first and second optical emitters of different, first and second colors provided on the tag, and driving the selected one of the emitters to emit the optical radiation.

13. The method according to claims 11 or 12, wherein driving the at least one optical emitter comprises configuring the tags so that no more than one of the tags emits any one of the colors during any of the time slots.

14. The method according to claim 11, wherein driving the at least one optical emitter comprises synchronizing all the tags responsively to a common synchronization input.

15. The method according to claim 14, wherein synchronizing all the tags comprises transmitting a synchronization signal over the air in the area containing the objects, and synchronizing each of the tags responsively to the synchronization signal.

16. The method according to claim 15, wherein the synchronization signal comprises a radio frequency (RF) signal.

17. The method according to claim 15, wherein the synchronization signal comprises an infrared (IR) signal.

18. The method according to claim 11, wherein the at least one optical emitter comprises at least one light-emitting diode (LED).

19. The method according to claim 11, and comprising processing the electronic images in the sequence in order to determine, responsively to the colors of the optical radiation emitted by the tags and the time slots in which the optical radiation is emitted, location coordinates of the tags.

20. The method according to claim 19, and comprising creating records of motion of the objects in the area, based on the location coordinates.

21. The method according to claim 20, wherein the objects comprise animals.

\* \* \* \* \*